United States Patent [19]

Borman

[11] 4,132,707

[45] Jan. 2, 1979

[54] PREPARATION OF BRANCHED POLY(ALKYLENE TEREPHTHALATES)

[75] Inventor: Willem F. H. Borman, Evansville, Ind.

[73] Assignee: General Electric Company, Pittsfield, Mass.

[21] Appl. No.: 747,637

[22] Filed: Dec. 6, 1976

[51] Int. Cl.$^2$ .................... C08G 63/26; C08G 63/70
[52] U.S. Cl. ................................. 528/273; 260/860
[58] Field of Search .......................... 260/860, 75 T

[56] References Cited

U.S. PATENT DOCUMENTS

| | | | |
|---|---|---|---|
| 3,629,366 | 12/1971 | Brinkmann | 260/860 |
| 3,843,615 | 10/1974 | Herwig et al. | 260/860 |
| 3,953,404 | 4/1976 | Borman | 260/75 M |
| 4,064,112 | 12/1977 | Rothe et al. | 260/75 M |

*Primary Examiner*—Lucille M. Phynes
*Attorney, Agent, or Firm*—Morgan, Finnegan, Pine, Foley & Lee

[57] ABSTRACT

A process for the preparation of branched poly(alkylene terephthalates) and mixtures of poly(alkylene terephthalates) is disclosed. The process comprises intimately blending the linear polyesters with a branching component, transforming the blend to a particulate state, and solid state polymerizing until a copolyester having the desired molecular weight is achieved.

14 Claims, No Drawings

PREPARATION OF BRANCHED POLY(ALKYLENE TEREPHTHALATES)

This invention relates to an improved process for preparing higher molecular weight branched poly(alkylene terephthalates). More particularly, it provides branched poly(1,4-butylene terephthalates) and mixtures of poly(ethylene terephthalate) and poly(1,4-butylene terephthalate) by solid state polymerizing particles of a solid mixture of the linear polyester with a minor amount of a branching component.

BACKGROUND OF THE INVENTION

Articles manufactured from poly(alkylene terephthalates) have many valuable characteristics, including strength, toughness, solvent resistance, high gloss, and the like. These articles may be fabricated by a number of well-known techniques, including injection molding, roto molding, blow molding, extrusion, and the like, depending on the shape of the desired product.

Certain of these techniques, in particular, blow molding and extrusion, require that the molten poly(alkylene terephthalates) have a suitably high melt viscosity, e.g., in excess of 10,000 poises, to prevent collapse or blow-outs in the soft preformed state. It has been found that poly(alkylene terephthalates) of such high melt viscosity are obtained only with great difficulty in the conventional bulk melt polymerization processes generally used to prepare the polyester.

It has been found that branching the poly(alkylene terephthalates) causes a desirable increase in melt viscosity and melt elasticity. Such branched materials have been made by adding a branching component to the ester-forming ingredients or to the low molecular weight prepolymers normally produced in making linear polyesters.

A method has now been found which permits the conversion of standard grade linear polyesters to branched copolyesters and this eliminates the need to make special branched polyester grades in commercial polymerization equipment.

By way of illustration, branched poly(1,4-butylene terephthalates) or mixed poly(ethylene terephthalate) and poly(1,4-butylene terephthalates) can be made according to this invention from a linear poly(1,4-butylene terephthalate) or mixture thereof with poly(ethylene terephthalate) and one or more branching agents containing three or more ester-forming functional groups by intimately blending the linear polyester or mixed polyesters and the branching agent, by extrusion, milling or other suitable means; followed by solid state polymerization of the mixture at a temperature below its melting point in a vacuum or in a stream of inert gas.

For instance, poly(1,4-butylene terephthalate) or mixed poly(ethylene terephthalate) and poly(butylene terephthalate) or intrinsic viscosity lower than 1.05 dl./g. may be blended with 0.15% by weight of pentaerythritol and the extrudate granulated. The granules are placed in a suitable solid state polymerization unit and heated to 190° to 210° C. in a stream of dry, inert gas until the intrinsic viscosity has increased to at least 1.1 dl./g. or higher. It is found that the pentaerythritol has reacted with the linear polyester to yield a branched polymer, characterized by its high melt viscosity and the rubbery nature of its melt. These characteristics make such polyesters particularly suited for blow molding, extrusion and plastic foam applications.

DESCRIPTION OF THE INVENTION

According to the present invention, there are provided branched copolyesters of poly(alkylene terephthalates) or mixed poly(alkylene terephthalates) and from 0.01 to 3 mole percent based on the terephthalate units, of units of a branching component which contains at least three ester-forming groups, the branched polyesters having an intrinsic viscosity of greater than about 1.1 dl./g., measured as a solution in a 60:40 mixture of phenol and tetrachloroethane at 30° C., by a process comprising:

(a) intimately blending a normally solid poly(alkylene terephthalate) or mixed poly(alkylene terephthalate) having an intrinsic viscosity of below about 1.05 dl./g., as measured in 60:40 mixture of phenol and tetrachloroethane at 30° C., with the branching component and transforming the intimate blend into a solid particulate state; and (b) heating the particles of solid polyester-branching component blend at a temperature of above 150° C. and below the melting point of said particles in the presence of an inert gas until the desired degree of increase in intrinsic viscosity is obtained.

The melt viscosity is determined under the conditions specified in the examples. Typically, a "high melt viscosity" resin is of greater than about 7,500 poises and generally in excess of about 10,000 poises at 250° C. In general, high melt viscosity resins will have an intrinsic viscosity, measured under the conditions stated later, in excess of about 1.1 dl./g.

The polyester resins with which this invention is concerned are, in general, saturated condensation products of $C_2$ to $C_{10}$ glycols, e.g., ethylene glycol, 1,4-butylene glycol, etc., and terephthalic acid, or reactive derivatives thereof, e.g., dimethyl terephthalate. The alkylene linkages can comprise, e.g., trimethylene, hexamethylene, decamethylene, and the like, linkages, as well as cycloaliphatic, e.g., 1,4-dimethylene-cyclohexane linkages. In addition to the terephthalic acid units, other dicarboxylic acid units, such as adipic, naphthalene dicarboxylic, isophthalic and orthophthalic units may be present in small amounts, e.g., from about 0.5 to about 15 mole percent of the total acid units. The mixed poly(alkylene terephthalates) can be used in all ratios, from 1 to 99 to 99 to 1 parts by weight in binary mixtures of poly(1,4-butylene terephthalate) and poly(ethylene terephthalate), for example.

The ultimate products are branched high melt viscosity poly(alkylene terephthalate) resins, and blended such resins which include a small amount of a branching component containing at least three ester-forming groups. The branching component can be one which provides branching in the acid unit portion of the polyester, or in the glycol unit portion, or it can be a hybrid. Illustrative of such branching components are tri- or tetra-carboxylic acids, such as trimesic acid, pyromellitic acid, and lower alkyl esters thereof, and the like, or preferably, polyols, and especially preferably, tetrols, such as pentaerythritol; triols, such as trimethylolpropane; or dihydroxy carboxylic acids and hydroxydicarboxylic acids and derivatives, such as dimethyl hydroxyterephthalate, and the like.

The relative amount of branching component used in step (a) to form the blend can vary, but is always kept at a minor proportion, e.g., of up to 5 mole percent maximum for every 100 moles of the terephthalate units in the linear polyester used as starting material. Preferably, the range of branching component included in the esterification mixture (and, generally, that included in the product), will be from 0.01 to 3 mole percent based on the terephthalate units. Especially preferably, it will comprise from about 0.02 to about 1 mole percent, based on the terephthalate component.

Processes for preparing the polyester starting materials used in this process are well known to those skilled in the art. The descriptions in U.S. Pat. Nos. 2,465,319; 3,047,539 and 3,692,744 are helpful.

The general procedure for making the starting resins is a condensation in the melt state, using an excess of the alkanediol and a dialkyl terephthalate or terephthalic acid. Heat (250° to 260° C.) and high vacuum (0.2 to 1.0 mm Hg) are used for a long enough time, e.g., 3 to 12 hours, to build the molecular weight by eliminating volatile byproducts. It has been found that the resins used as starting material in this solid state process should be normally solid and, have an intrinsic viscosity of at most about 1.05 dl./g. Moreover, it should be predominantly hydroxyl terminated. If the intrinsic viscosity is below 0.5, the 1.1 minimum will be reached, but in a longer time. Both of these requirements are achieved easily, the first by carrying out the condensation for sufficient time until a sample reaches the desired intrinsic viscosity, and the second by using an excess of the diol component in the reaction mixture.

The process of this invention is carried out in two steps, first, intimately blending the polyester or mixed polyesters and branching component, then transforming to a solid particulate state and, second, heating the particles until the desired degree of increase in intrinsic viscosity is obtained.

Experiments have shown that pellets, e.g., extruded and chopped cubes, cylinders, spheres, irregular shapes, and the like, of up to $\frac{1}{4}$ inch maximum dimension, react in the solid state as well as the ground polymer, in the long run. However, to obtain a more homogeneous polymer, grinding of the feed is preferable. It is convenient to grind the feed, e.g., by passing it through a mill with dry ice cooling, using a coarse screen.

Alternately, a small amount of 1,4-butanediol may be added to the inert gas stream to moderate the reaction and obtain a more homogeneous product. Confer, U.S. Pat. No. 3,953,404, incorporated herein by reference.

With respect to the heating stage, experiments have shown that solid state polymerization proceeds readily at temperatures above about 150° C. The rate is especially rapid at 200° C. or 210° C., and measurably slower at 150° C. or 160° C. The most preferred temperature range is between 180° C. and 210° C. and especially between 190° C. and 210° C. These temperatures refer to the resin temperature. External temperatures are necessarily higher because of heat transfer losses.

The preferred inert gas is nitrogen, although if desired, argon, helium, carbon dioxide, or mixtures thereof with or without nitrogen may be employed.

The particles can be in a fixed or fluidized bed during the heating step. The particles can be agitated in any conventional manner, if desired. A fluidizing stream of nitrogen can provide agitation, removal of volatiles and an inert atmosphere.

The time required for step (b) of the process can vary, depending on the temperature and the intrinsic viscosity desired. In general, it will be between about $\frac{1}{2}$ hour and several days, e.g., up to 96 hours, or longer. As will be seen from the example, ungelled polymer having an intrinsic viscosity of up to 1.28, and higher, can be obtained in only 16 hours at 200° C. and atmospheric pressure.

The polyester products of this invention can be combined with conventional additives, such as reinforcements, stabilizers, antioxidants, plasticizers, lubricity promoters, dyes, pigments, flame retardant additives, and the like. The products are useful for all fabricating purposes, but especially so for blow molding and extrusion and plastic foam applications.

DESCRIPTION OF THE PREFERRED EMBODIMENTS

The following non-limiting examples illustrate the process of this invention.

EXAMPLE 1

A blend of poly(1,4-butylene terephthalate) (PBT) with 0.15% pentaerythritol is prepared by co-extrusion and pelletized (approx. $\frac{1}{8}$ inch cubes).

380 g. of this blend is placed in a 3-liter round bottom flask, attached to a rotary evaporator, and immersed partially in a hot oil bath.

During the first 40-minute period, the oil temperature is increased from 150° to 210° C., while the pressure is maintained at 22 mm Hg. After an additional 2-hour period under these reaction conditions, the melt viscosity of the product has increased from 4,100 to 4,450 poises at 250° C. (shear stress 14.4 psi). The pressure is reduced further to 0.3 mm Hg, and the melt viscosity increases further to 6,830 poises over the next 7-hour period. During the next 7½-hour reaction time under 0.1 mm Hg, the melt viscosity increases to 33,550 poises at the shear stress of 14.7 psi. The intrinsic viscosity of the pellets at this stage is 1.28 dl./g.

EXAMPLE 2

A 40:60 w/w blend of poly(ethylene terephthalate) and PBT is extruded with 0.15% of pentaerythritol and pelletized into $\frac{1}{8}$ inch particles. The blend is heated in a rotary evaporator under 0.1 mm Hg while partially immersed in an oil bath kept at 215° C. for a period of 6 hours.

The melt viscosity increases from 3,300 poises to 31,200 poises during this time, as measured at 510° F. and a shear stress of 11.1 psi. When the shear stress is increased, the melt viscosity decreases sharply (25,800 poises at 22.2 psi, 3,800 poises at 84 psi), indicative of the presence of branched molecules in the polymer composition. The branched structure of the polymer is also confirmed by the rubbery nature and high die swell observed in the melt emerging from the capillary rheometer during the determination of melt viscosity.

EXAMPLE 3

Pentaerythritol, 2.6 g., is dispersed in 2,000 g. of poly(1,4-butylene terephthalate) and co-extruded twice to assure thorough blending.

The pelletized extrudate, 225 g., is heated in a 3 inch diameter fluidized bed reactor in a stream of nitrogen containing 1,800 ppm of butanediol vapor. After 4 hours at 203° C., the melt viscosity at 250° C. is 6,500 poises at a shear stress of 6.2 psi. The reaction is continued without the presence of 1,4-butanediol vapor in the nitrogen stream. In the following 2 hours, the melt viscosity increases to 28,000 poises, and in the subsequent 80 minutes to 75,200 poises.

The appearance of the extrudate from the rheometer (die swell, rubberiness) is indicative of the branched nature of the product molecules.

Obviously, other modifications and variations of the present invention are possible in the light of the above teachings. For example, trimethyolethane and trimethyl trimesate can be substituted for the pentaerythritol as the branching component. It is, therefore, to be understood that changes may be made in the particular embodiment described which will be within the full intended scope of the invention as defined by the appended claims.

I claim:

1. A method for the preparation of a high molecular weight copolyester consisting essentially of a poly(alkylene terephthalate) or a mixed poly(alkylene terephthalate) and from 0.01 to 3 mole percent, based on the terephthalate units, of units of a branching component which contains at least three ester-forming groups, said polyester or mixed polyester having an intrinsic viscosity of greater than about 1.1 dl./g., as measured as a solution in a 60:40 mixture of phenol and tetrachloroethane at 30° C., said process comprising:
    (a) intimately blending a normally solid linear poly(alkylene terephthalate) or mixed poly(alkylene terephthalate) having an intrinsic viscosity of below about 1.05 dl./g., measured as a solution in a 60:40 mixture of phenol and tetrachloroethane at 30° C., with said branching component and transforming the intimate blend into a solid particulate state; and
    (b) heating the particles of solid polyester-branching component blend at a temperature of above 150° C. and below the melting point of said particles in the presence of an inert gas until the desired degree of increase in intrinsic viscosity is obtained.

2. A process as defined in claim 1 wherein said poly(alkylene terephthalate) is poly(1,4-butylene terephthalate).

3. A process as defined in claim 1 wherein said mixed poly(alkylene terephthalate) comprises poly(ethylene terephthalate) and poly(1,4-butylene terephthalate).

4. A process as defined in claim 1 wherein heating step (b) is carried out between 150° and 210° C.

5. A process as defined in claim 4 wherein heating step (b) is carried out between 180° and 210° C.

6. A process as defined in claim 5 wherein heating step (b) is carried out between 190° and 210° C.

7. A process as defined in claim 1 wherein the inert gas is nitrogen.

8. A process as defined in claim 1 wherein the branching component is a polyol.

9. A process as defined in claim 8 wherein the branching component is trimethylolethane.

10. A process as defined in claim 8 wherein said branching component is pentaerythritol.

11. A process as defined in claim 1 wherein the branching component is a tricarboxylic acid, a tetracarboxylic acid or a low alkyl ester thereof.

12. A process as defined in claim 11 wherein said branching component is trimethyl trimesate.

13. A solid state process for the preparation of a high melt viscosity branched copolyester consisting essentially of poly(1,4-butylene terephthalate) or of a mixture of poly(ethylene terephthalate) and poly(1,4-butylene terephthalate) and from 0.01 to 3 mole percent based on the terephthalate units, of units of a branching component which contains at least three ester-forming groups, said polyester or mixture of polyesters having an intrinsic viscosity of greater than about 1.1 dl./g., measured as a solution in a 60:40 mixture of phenol and tetrachloroethane at 30° C., said process comprising:
    (a) intimately blending a normally solid poly(1,4-butylene terephthalate) or a mixture of poly(ethylene terephthalate) and poly(1,4-butylene terephthalate) having an intrinsic viscosity of from about 0.5 to about 1.05 dl./g., with said branching component and transforming the intimate blend into a solid, particulate state; and
    (b) heating the particles of said solid polyester-branching component blend in the presence of an inert gas at a temperature of about 150° C. and below the melting point thereof until the desired degree of increase in intrinsic viscosity is obtained.

14. A process as defined in claim 13 wherein the branching component comprises 0.15 percent by weight of pentaerythritol, based on the weight of poly(1,4-butylene terephthalate) or mixture of poly(ethylene terephthalate) and poly(1,4-butylene terephthalate) and step (b) is carried out at a temperature range of 190° to 210° C. until the intrinsic viscosity has increased to at least 1.1 dl./g.

* * * * *